United States Patent
Muramoto

(10) Patent No.: US 8,106,550 B2
(45) Date of Patent: Jan. 31, 2012

(54) POLYPHASE ALTERNATING-CURRENT MOTOR AND ELECTRIC POWER STEERING APPARATUS

(75) Inventor: Yoshinobu Muramoto, Toyoake (JP)

(73) Assignee: JTEKT Corporation, Osaka-Shi (JP)

( * ) Notice: Subject to any disclaimer, the term of this patent is extended or adjusted under 35 U.S.C. 154(b) by 297 days.

(21) Appl. No.: 12/591,538

(22) Filed: Nov. 23, 2009

(65) Prior Publication Data
US 2010/0133934 A1   Jun. 3, 2010

(30) Foreign Application Priority Data
Nov. 28, 2008 (JP) ................................. 2008-303498

(51) Int. Cl.
*H02K 11/00* (2006.01)
(52) U.S. Cl. .......................................... 310/71; 310/194
(58) Field of Classification Search .................... 310/71, 310/194, 214
See application file for complete search history.

(56) References Cited

U.S. PATENT DOCUMENTS

| | | | | |
|---|---|---|---|---|
| 7,193,345 B2* | 3/2007 | Shinzaki et al. | | 310/71 |
| 7,723,878 B2* | 5/2010 | Yagai et al. | | 310/71 |
| 2004/0070293 A1* | 4/2004 | Kabasawa et al. | | 310/71 |
| 2004/0183388 A1* | 9/2004 | Rittmeyer | | 310/179 |
| 2005/0269895 A1* | 12/2005 | Innami et al. | | 310/218 |
| 2006/0006749 A1* | 1/2006 | Sasaki et al. | | 310/68 R |
| 2007/0052307 A1* | 3/2007 | Yoshida et al. | | 310/71 |
| 2007/0080592 A1* | 4/2007 | Ohta et al. | | 310/71 |

FOREIGN PATENT DOCUMENTS

JP    A-2003-299287    10/2003

* cited by examiner

Primary Examiner — Quyen Leung
Assistant Examiner — Naishadh Desai
(74) Attorney, Agent, or Firm — Oliff & Berridge, PLC

(57) ABSTRACT

In a motor that includes bus bars each of which has an intermediate electrical path portion, end electrical path portions, and a main electrical path portion, the width of a portion of the intermediate electrical path portion at which the multiple end electrical path portions are formed between the main electrical path portion and an end portion of the intermediate electrical path portion is decreased from the portion at which the main electrical path portion is formed toward the end portion of the intermediate electrical path portion in such a manner that the width is decreased immediately after each intervening end electrical path portion by a unit width "w" that is equal to the width of the end electrical path portion. Thus, it is possible to prevent the current density in the intermediate electrical path portion from being excessive so that the current density is maintained substantially constant, and to attain lighter bus bars, and, consequently, to attain a lighter motor.

13 Claims, 10 Drawing Sheets

F I G . 5
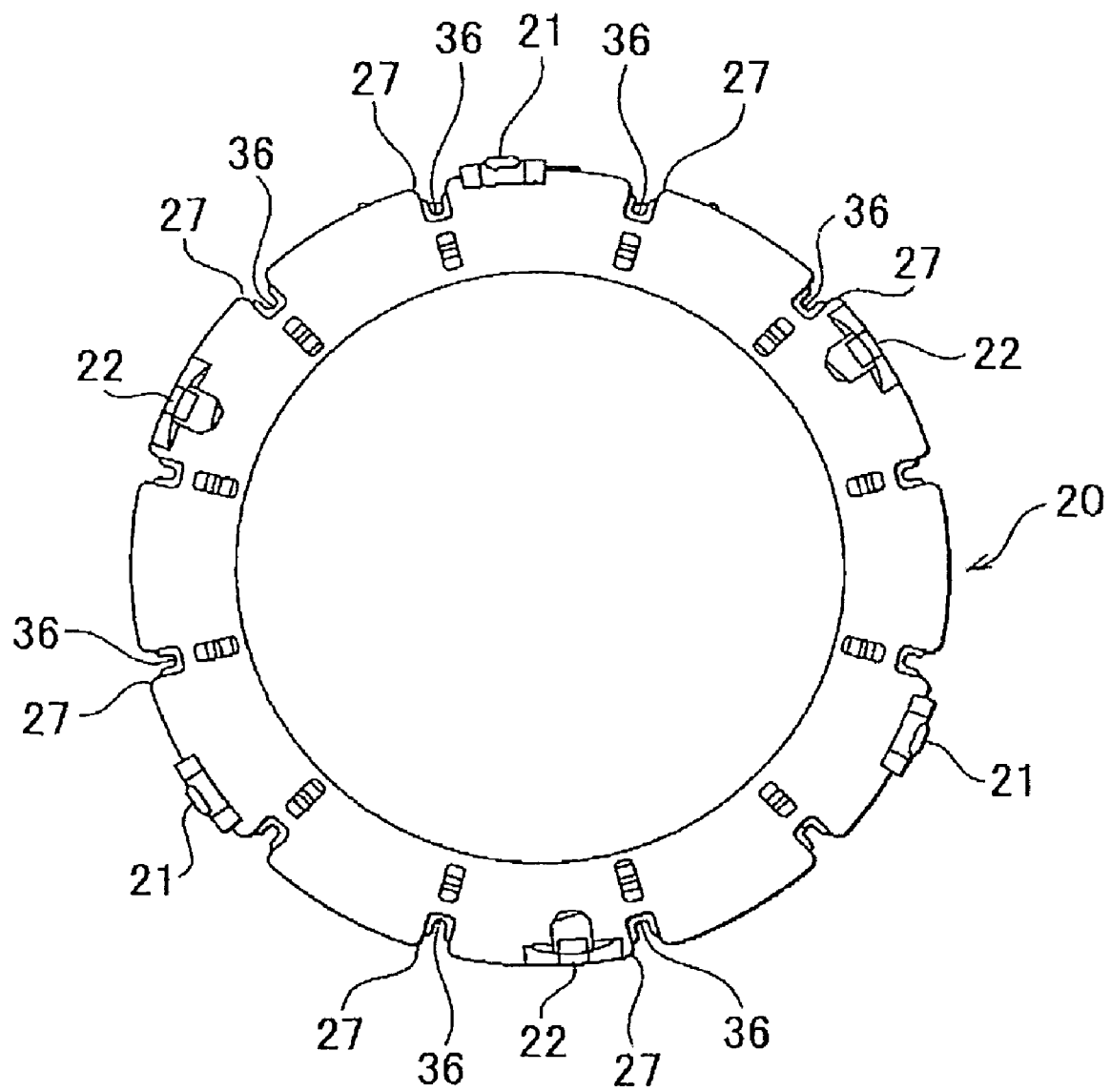

POLYPHASE ALTERNATING-CURRENT MOTOR AND ELECTRIC POWER STEERING APPARATUS

INCORPORATION BY REFERENCE

The disclosure of Japanese Patent Application No. 2008-303498 filed on Nov. 28, 2008 including the specification, drawings and abstract is incorporated herein by reference in its entirety.

BACKGROUND OF THE INVENTION

1. Field of the Invention

The invention relates to a polyphase alternating-current motor that includes bus bars and an electric power steering apparatus.

2. Description of the Related Art

In a polyphase alternating-current motor of the above-mentioned type, each of bus bars the number of which corresponds to the number of phases includes an intermediate electrical path portion, a plurality of end electrical path portions, and a main electrical path portion. The intermediate electrical path portion has a constant width and extends along the circumferential direction of a stator. The end electrical path portions branch from the intermediate electrical path portion at multiple positions in the circumferential direction of the stator. The main electrical path portion is formed at one position of the intermediate electrical path portion. End portions of coils that are wound around respective teeth of the stator are connected to the respective end electrical path portions, and a motor drive circuit is connected to the main electrical path portion (refer to, for example, Japanese Patent Application Publication No. 2003-299287 (JP-A-2003-299287)).

There has been a demand for lighter polyphase alternating-current motors. Therefore, attaining lighter bus bars that are metal components is effective in attaining lighter polyphase alternating-current motors. However, if the width of an intermediate electrical path portion of a bus bar is uniformly reduced so that the width is constant from one end portion to the other end portion of the intermediate electrical path portion, there may arise a problem that a current density becomes excessive in a portion of the intermediate electrical path portion that is close to a main electrical path portion.

SUMMARY OF THE INVENTION

It is an object of the invention to provide a polyphase alternating-current motor with which the above-described problem is solved, and an electric power steering apparatus that includes the polyphase alternating-current motor.

An aspect of the invention relates to a polyphase alternating-current motor in which multiple bus bars the number of which corresponds to the number of phases, that are connected to a motor drive circuit, and that receive a polyphase alternating-current are arranged at one end portion of a stator, and end portions of a plurality of coils that are arranged in the circumferential direction of the stator are connected to the corresponding bus bars. Each of the bus bars has an intermediate electrical path portion that extends along the circumferential direction of the stator, a plurality of end electrical path portions that branch from the intermediate electrical path portion at multiple positions in the circumferential direction of the stator, and that are connected at end portions to the end portions of the coils, and a main electrical path portion that is formed at one position of the intermediate electrical path portion, and that is connected to the motor drive circuit. The width of a portion of the intermediate electrical path portion at which the multiple end electrical path portions are formed between the main electrical path portion and the end portion of the intermediate electrical path portion is decreased from a portion at which the main electrical path portion is formed toward the end portion of the intermediate electrical path portion in such a manner that the width is decreased after each intervening end electrical path portion.

In the polyphase alternating-current motor structured as described above, in the portion of the intermediate electrical path portion of the bus bar at which the multiple end electrical path portions are formed between the main electrical path portion and the end portion of the intermediate electrical path portion, the amount of electric current flowing therethrough decreases from the portion at which the main electrical path portion is formed toward the end portion of the intermediate electrical path portion in such a manner that the amount of electric current decreases after each intervening end electrical path portion. Therefore, according to the first aspect, the width of the intermediate electrical path portion is decreased from the portion at which the main electrical path portion is formed toward the end portion of the intermediate electrical path portion in such a manner that the width is decreased after each intervening end electrical path portion. Thus, it is possible to prevent the current density in the intermediate electrical path portion from being excessive, and to attain the lighter bus bars, and, consequently, to attain the lighter polyphase alternating-current motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a bottom view showing the bus bar holder;

DETAILED DESCRIPTION OF THE EMBODIMENTS

Figure 1:
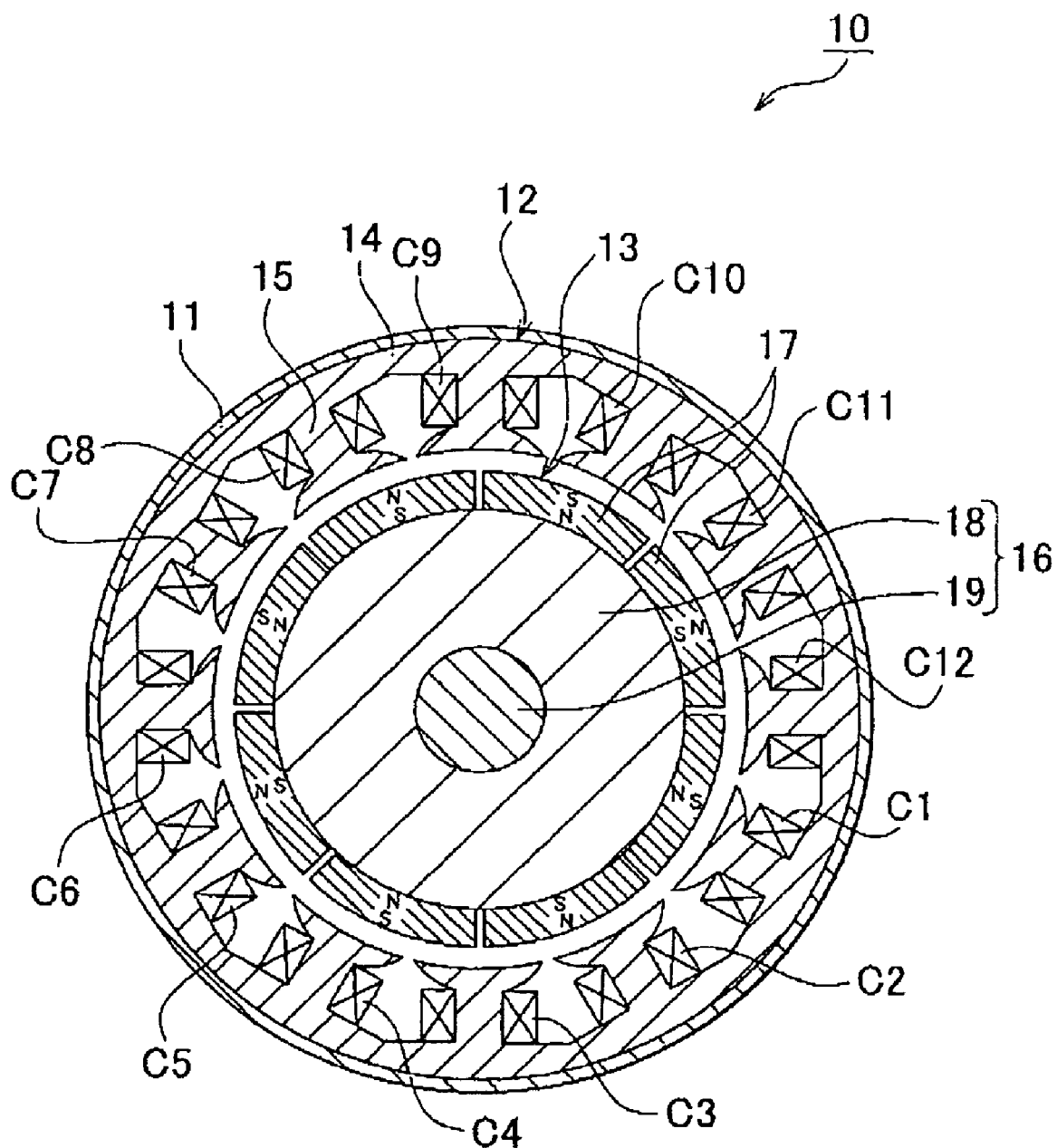
FIG. 1 is a plane cross-sectional view showing a polyphase alternating-current motor according to an embodiment of the invention.

Hereafter, an embodiment of the invention will be described with reference to FIGS. 1 to 10. A polyphase alternating-current motor 10 (hereinafter, simply referred to as "motor 10") according to the embodiment is a three-phase alternating-current brushless motor. In the motor 10, a stator 12 is arranged in a cylindrical housing 11, and a rotor 13 is arranged on the inner side of the stator 12, as shown in FIG. 1.

The rotor 13 has a plurality of (e.g. eight) segment field magnets 17 arranged on the outer peripheral face of a rotor yoke 16. The rotor yoke 16 has a structure in which a rotor shaft 19 passes through the center of a cylindrical yoke body 18 that is formed by laminating a plurality of, for example, silicon steel sheets.

The stator 12 is formed of a stator core 14 and a plurality of coils C1 to C12 that are arranged in the circumferential direction of the stator core 14. Multiple (e.g. twelve) teeth 15 project inward from the inner face of the stator core 14, and wires 50 (see FIG. 4) are wound around the respective teeth 15, whereby the twelve coils C1, C2, C3, C4, C5, C6, C7, C8, C9, C10, C11, and C12 are formed.

Figure 2:
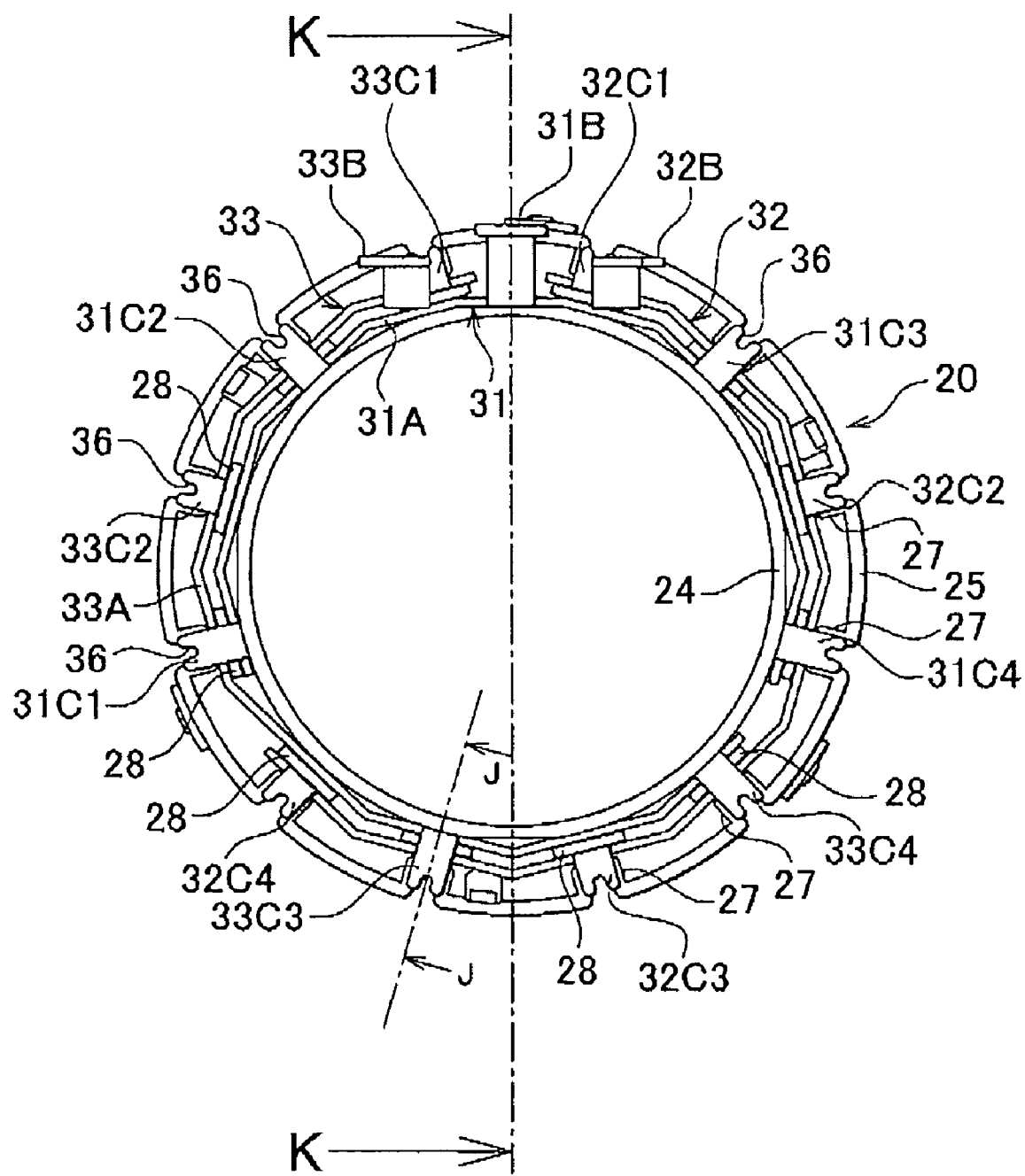
FIG. 2 is a plane view showing bus bars and a bus bar holder.
Figure 4:
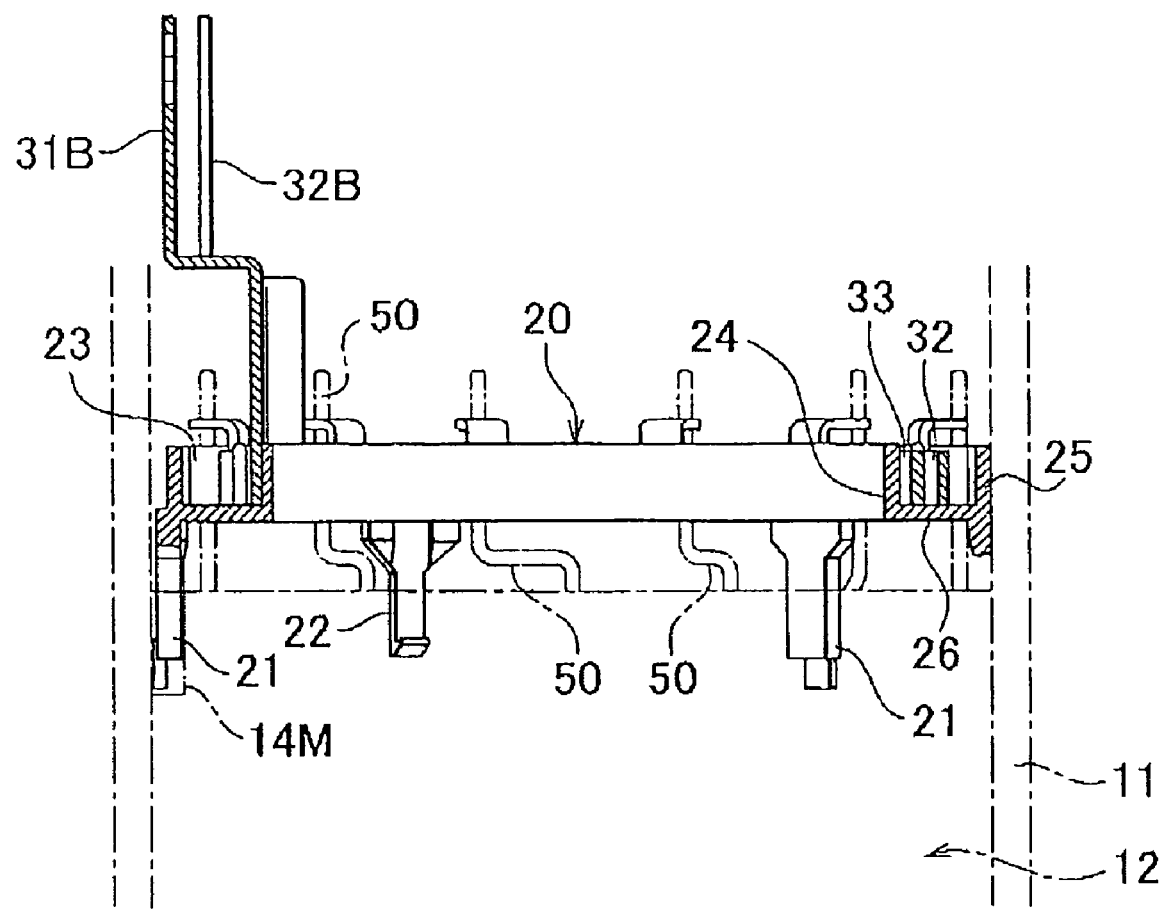
FIG. 4 is a cross-sectional view taken along the line K-K in FIG. 2.

As shown in FIG. 4, end portions of the coils C1 to C12 (wires 50) are all located on one end side of the stator core 14. As shown in FIG. 2, three bus bars 31, 32, and 33 are arranged on the one end side of the stator core 14, on which the end portions of the coils C1 to C12 are all located, and at the position corresponding to the perimeter portion of the stator core 14. Hereafter, when the bus bars 31, 32 and 33 need to be distinguished from each other, the bus bars 31, 32 and 33 will be referred to as "first bus bar 31", "second bus bar 32" and "third bus bar 33", respectively.

The three bus bars 31, 32 and 33 are made of metal sheets. The first bus bar 31 includes a strip-shaped intermediate electrical path portion 31A that extends, while bending at multiple portions, along the circumferential direction of the stator 12, multiple (four, in the embodiment) end electrical path portions 31C1 to 31C4 that branch from the intermediate electrical path portion 31A at multiple positions in the circumferential direction of the stator 12, and one main electrical path portion 31B that branches from the intermediate electrical path portion 31A at one position. The intermediate electrical path portion 31A, the end electrical path portions 31C1 to 31C4, and the main electrical path portion 31B are integrally formed. The second bus bar 32 includes a strip-shaped intermediate electrical path portion 32A that extends, while bending at multiple portions, along the circumferential direction of the stator 12, multiple (four, in the embodiment) end electrical path portions 32C1 to 32C4 that branch from the intermediate electrical path portion 32A at multiple positions in the circumferential direction of the stator 12, and one main electrical path portion 32B that branches from the intermediate electrical path portion 32A at one position. The intermediate electrical path portion 32A, the end electrical path portions 32C1 to 32C4, and the main electrical path portion 32B are integrally formed. The third bus bar 33 includes a strip-shaped intermediate electrical path portion 33A that extends, while bending at multiple portions, along the circumferential direction of the stator 12, multiple (four, in the embodiment) end electrical path portions 33C1 to 33C4 that branch from the intermediate electrical path portion 33A at multiple positions in the circumferential direction of the stator 12, and one main electrical path portion 33B that branches from the intermediate electrical path portion 33A at one position. The intermediate electrical path portion 33A, the end electrical path portions 33C1 to 33C4, and the main electrical path portion 33B are integrally formed. The intermediate electrical path portions 31A, 32A and 33A have the same thickness, and the end electrical path portions 31C1 to 31C4, 32C1 to 32C4, and 33C1 to 33C4 have the same thickness. In order to arrange a total of twelve end electrical path portions 31C1 to 31C4, 32C1 to 32C4 and 33C1 to 33C4 at regular intervals in the circumferential direction of the stator 12, the three bus bars 31, 32 and 33 are offset 120 degrees from each other. The intermediate electrical path portions 31A, 32A and 33A are partially overlapped with each other in the radial direction of the stator 12.

Figure 3:
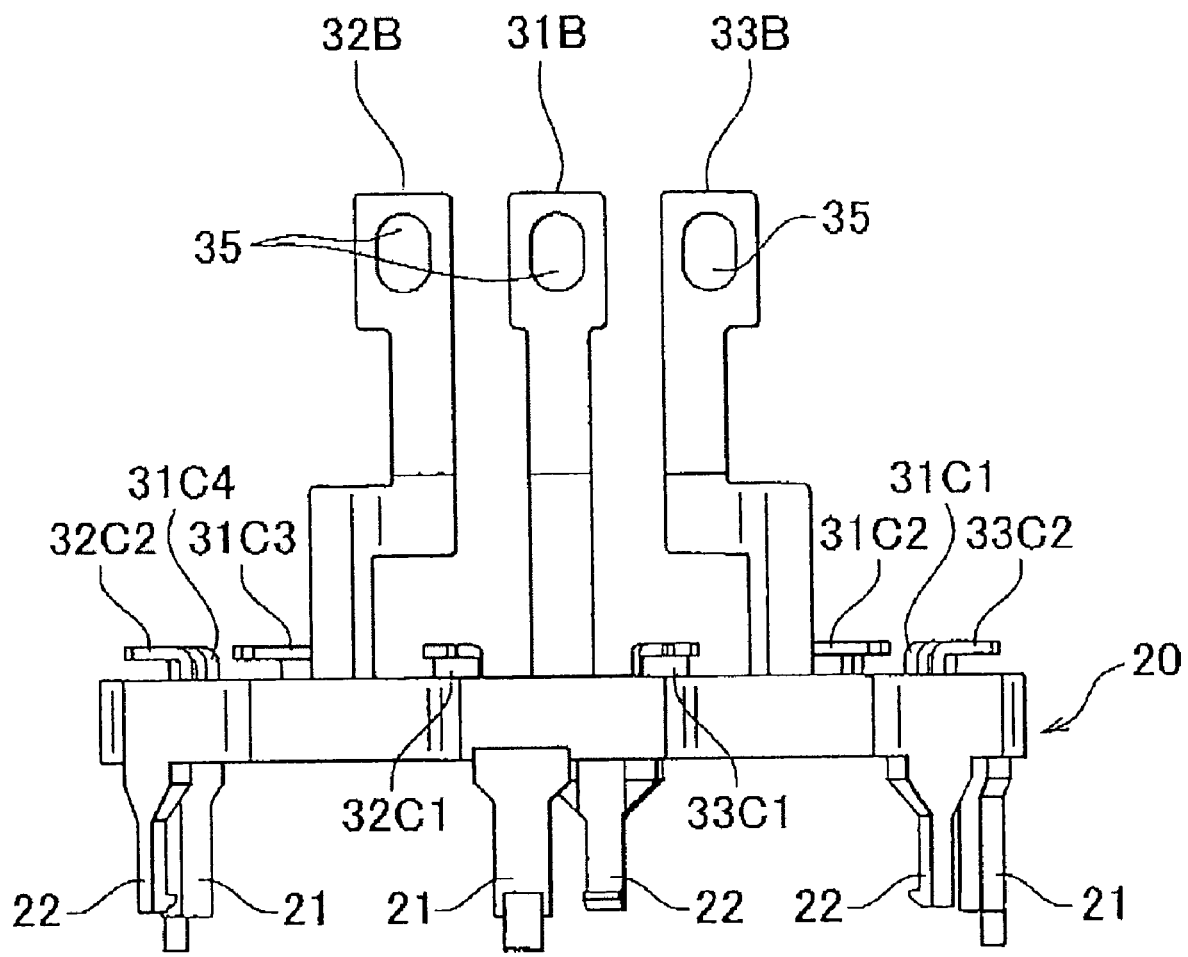
FIG. 3 is a side view showing the bus bars and the bus bar holder.

The main electrical path portions 31B, 32B and 33B project from the intermediate electrical path portions 31A, 32A, and 33A, respectively, in the direction away from the stator 12 (toward the reader in the direction perpendicular to the sheet on which FIG. 2 is drawn) (see FIG. 3). The main electrical path portions 31B, 32B and 33B are cranked outward at their middle portions. In each of the main electrical path portions 31B, 32B and 33B, the width of the end portion is greater than that of the other portion, and the width of the other portion is constant. Long holes 35 that pass through the respective end portions are formed (see FIG. 3).

The main electrical path portion 31B of the first bus bar 31, the main electrical path portion 32B of the second bus bar 32, and the main electrical path portion 33B of the third bus bar 33 are arranged in the lateral direction and placed at one position in the circumferential direction of the stator 12. Accordingly, the main electrical path portions 31B, 32B and 33B are located close to each other. More specifically, the main electrical path portion 31B of the first bus bar 31 rises from the intermediate electrical path portion 31A at the middle position in the longitudinal direction of the intermediate electrical path portion 31A (circumferential direction of the stator 12). The second bus bar 32 is offset 120 degrees from the first bus bar 31 in one direction in the circumferential direction. The third bus bar 33 is offset 120 degrees from the first bus bar 31 in the other direction in the circumferential direction. The main electrical path portion 32B of the second bus bar 32 and the main electrical path portion 33B of the third bus bar 33 rise from the intermediate electrical path portion 32A and the intermediate electrical path portion 33A at one of the longitudinal end portions that are closer to the main electrical path portion 31B of the first bus bar 31 than the other longitudinal end portions, respectively. The main electrical path portions 32B and 33B are bent at right angles at the middle portions so as to approach the main electrical path portion 31B of the first bus bar 31. The second bus bar 32 and the third bus bar 33 are symmetrical with each other (see FIGS. 2 and 3). For example, the second bus bar 32 and the third bus bar 33 may be made from metal sheets formed in the same shape through a stamping process using the same stamping die, and formed by bending the portions corresponding to the main electrical path portions, the intermediate electrical path portions and the end electrical path portions in such a manner that these portions of the second bus bar 32 and these portions of the third bus bar 33 are bent in the opposite directions.

A connector portion 19A (see FIG. 7) is provided at one end portion of the cylindrical housing 11 of the motor 10. The end portions of the main electrical path portion 31B of the first bus bar 31, the main electrical path portion 32B of the second bus bar 32 and the main electrical path portion 33B of the third bus bar 33 extend inside a rectangular cylinder (not shown) that forms the connector portion 19A.

The four end electrical path portions 31C1 to 31C4 of the first bus bar 31, the four end electrical path portions 32C1 to 32C4 of the second bus bar 32, and the four end electrical path portions 33C1 to 33C4 of the third bus bar 33 project from the intermediate electrical path portions 31A, 32A, and 33A, respectively, in the direction away from the stator 12, and are bent at right angles toward the peripheral wall of the cylindrical housing 11 (see FIG. 3). As shown FIG. 2, slits 36 that extend in the axial direction of the stator 12 are formed in the end portions of the end electrical path portions 31C1 to 31C4, 32C1 to 32C4, and 33C1 to 33C4. The end electrical path portions 31C1 to 31C4, 32C1 to 32C4, and 33C1 to 33C4 have the same width.

The above-described three bus bars 31, 32 and 33 are held by a bus bar holder 20 that is arranged on the one end side of the stator core 14, on which the end portions of the coils C1 to C12 are all located (see FIG. 4).

As shown in FIG. 2, the bus bar holder 20 has an annular structure that corresponds to the stator core 14, and holds the three bus bars 31, 32 and 33 in the state where these bus bars 31, 32 and 33 are insulated from each other.

More specifically, the bus bar holder 20 has an annular groove structure in which one end portions of an annular inner wall 24 and an annular outer wall 25 that are coaxially arranged are connected to each other by an annular bottom wall 16, and the other end portions of the annular inner wall 24 and the annular outer wall 25, the other end portions being far from the stator core 14, are open end portions (see FIG. 4). The three bus bars 31, 32 and 33 are placed in an annular recess 23 that is surrounded by the annular inner wall 24, the annular outer wall 25 and the annular bottom wall 26.

Side face recesses 27 (see FIGS. 2 and 5) that are formed by recessing the annular outer wall 25 toward the annular inner wall 24 are present at positions that are defined by equally diving the bus bar holder 20 by twelve in the circumferential direction. The end portions of the coils C1 to C12 (wires 50) that are all located on the one end side of the stator 12 pass through the respective twelve side face recesses 27. The twelve side face recesses 27 coincide with the end portions of the respective twelve end electrical path portions 31C1 to 31C4, 32C1 to 32C4 and 33C1 to 33C4 in the axial direction of the stator 12 (FIGS. 2 and 5). The end portions of the coils C1 to C12 are placed in the slits 36 of the end electrical path portions 31C1 to 31C4, 32C1 to 32C4, and 33C1 to 33C4, and welded to the end electrical path portions 31C1 to 31C4, 32C1 to 32C4 and 33C1 to 33C4, respectively.

Portions of the annular recess 23 of the bus bar holder 20, at which the side face recesses 27 are formed, are narrow portions where the distance between the annular inner wall 24 and the annular outer wall 25 is less than that of the other portion, and insulation walls 28 are arranged at the respective narrow portions. The insulation walls 28 rise from the annular bottom wall 26, and face the annular inner wall 24 and the annular outer wall 25 in the radial direction.

Because the intermediate electrical path portions 31A, 32A and 33A are clamped between the annular inner wall 24 and the insulation walls 28 or between the insulation walls 28 and the annular outer wall 25, the three bus bars 31, 32 and 33 are held by the bus bar holder 20.

Figure 6:
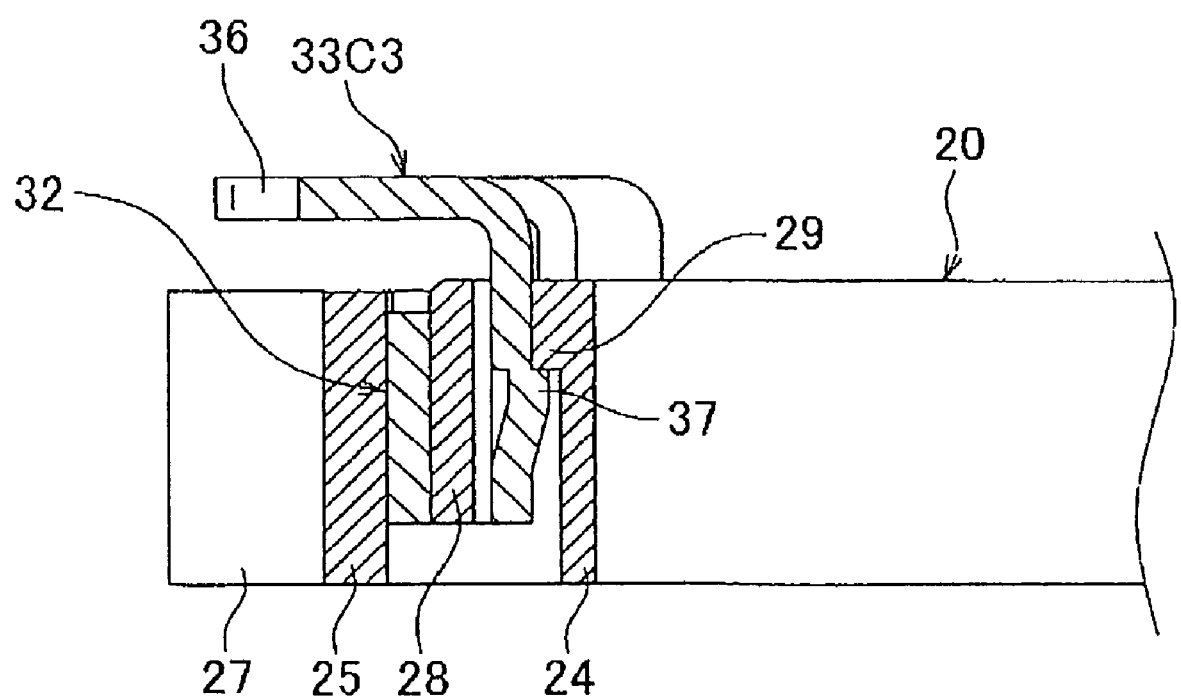
FIG. 6 is a cross-sectional view taken along the line J-J in FIG. 2.

As shown in FIG. 6, engagement projections 37 that project toward the annular inner wall 24 are formed at portions of the intermediate electrical path portion 31A, from which the four end electrical path portions 31C1 to 31C4 project and which are clamped between the annular inner wall 24 and the insulation walls 28, and at portions of the intermediate electrical path portion 33A, from which the end electrical path portions 33C3 and 33C4 project and which are clamped between the annular inner wall 24 and the insulation walls 28. The engagement projections 37 are engaged with engagement step portions 29 that are formed in the annular inner wall 24.

As shown in FIG. 3, positioning pieces 21 and engagement pieces 22 extend toward the stator core 14 from the bus bar holder 20 at multiple circumferential positions. As shown in FIG. 5, the bus bar holder 20 has three positioning pieces 21 and three engagement pieces 22, and the positioning pieces 21 and the engagement pieces 22 are alternately arranged at respective positions that are defined by equally dividing the bus bar holder 20 by six in the circumferential direction. When the positioning pieces 21 are fitted in positioning longitudinal grooves 14M (see FIG. 4) formed in one end portion of the outer peripheral face of the stator core 14, the position of the bus bar holder 20 is defined in the circumferential direction. Each engagement piece 22 is a so-called snap-fit piece, and an engagement hook formed at the end portion of the engagement piece 22 is engaged with the one end portion of the outer peripheral face of the stator core 14.

Figure 8:
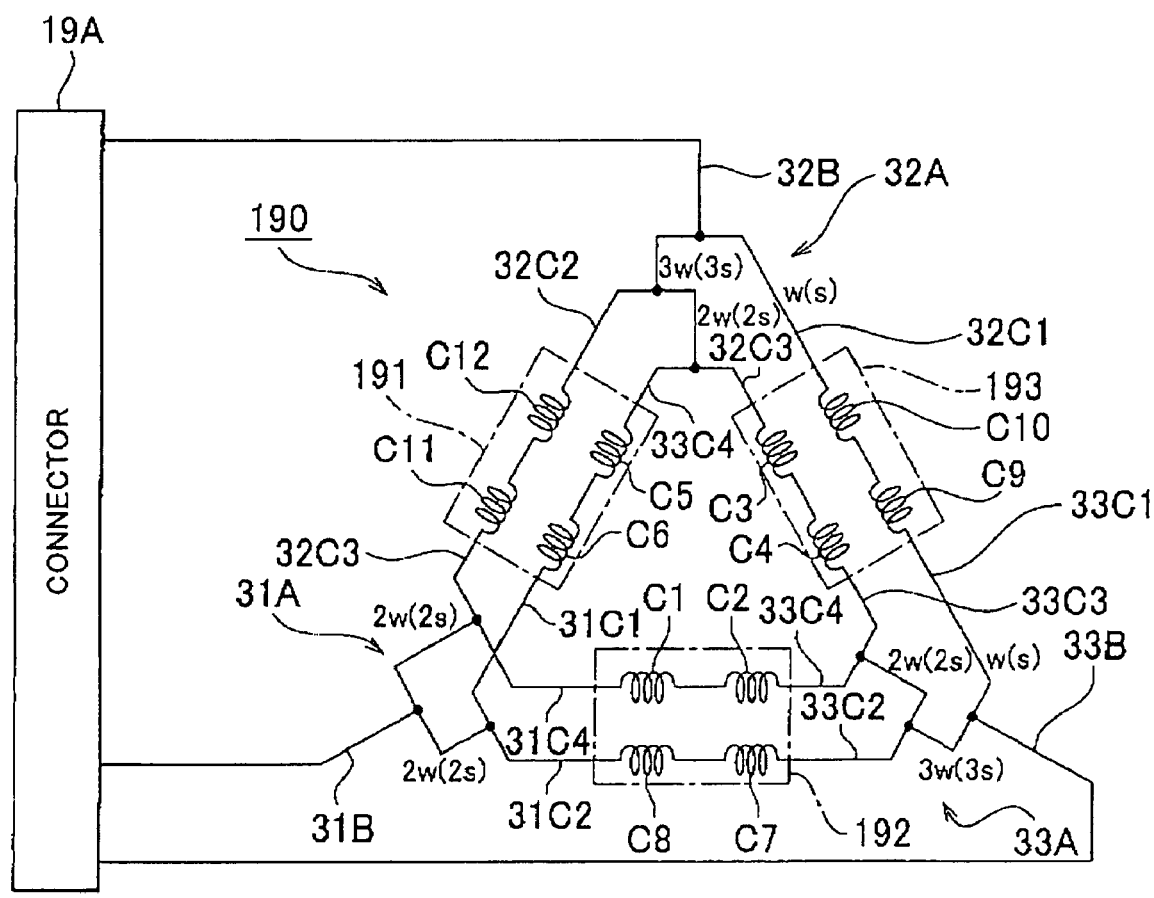
FIG. 8 is a conceptual diagram showing a motor circuit.

The twelve coils C1 to C12 of the stator core 14 are connected to each other by the three bus bars 31, 32 and 33 held by the bus bar holder 20, whereby a three-phase motor circuit 190 shown in FIG. 8 is formed.

Figure 7:
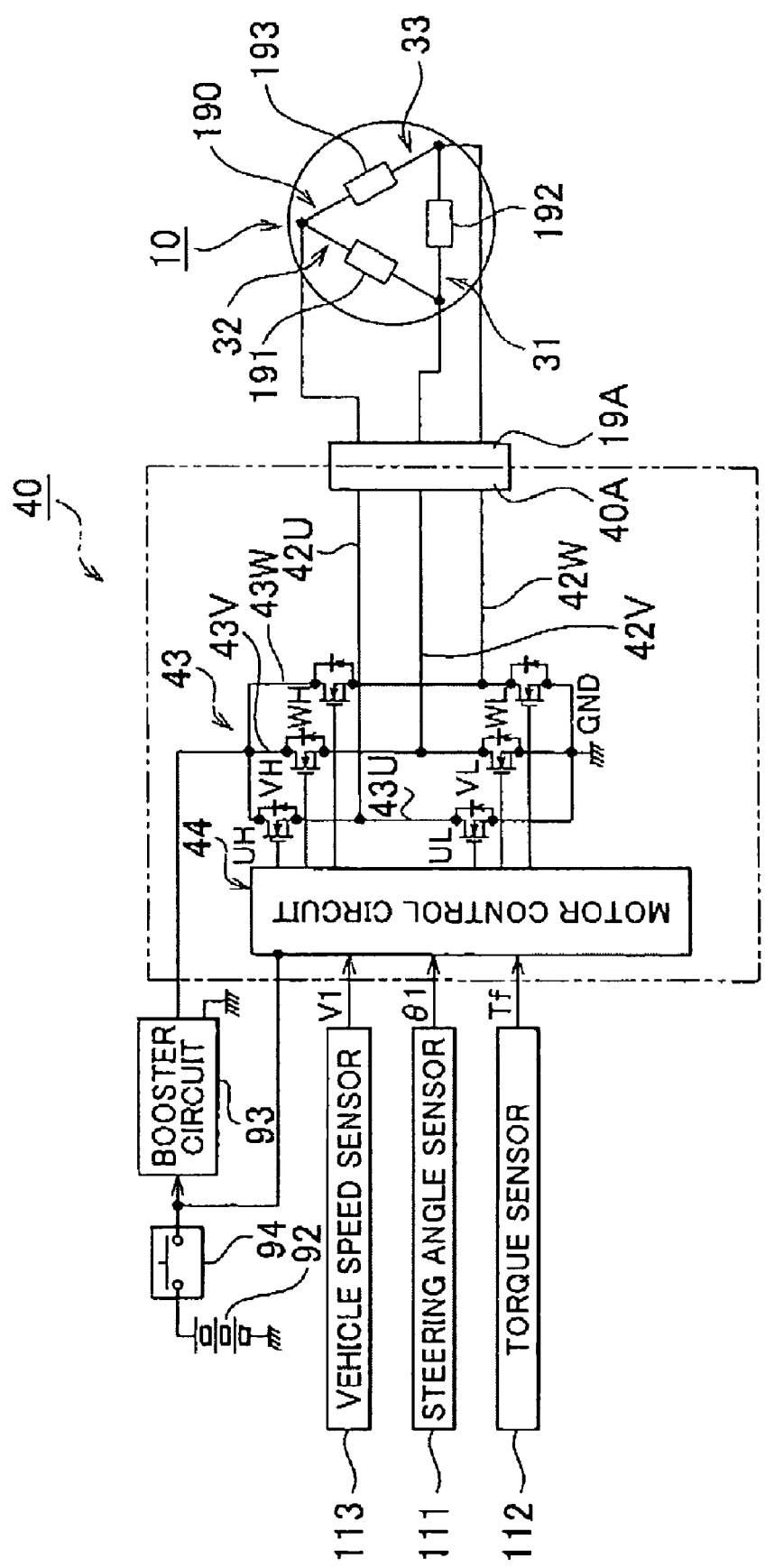
FIG. 7 is a block diagram showing a motor drive control circuit.

A motor drive control circuit 40 that is used to control and drive the motor 10 will be described before describing the motor circuit 190. As shown in FIG. 7, the motor drive control circuit 40 includes a motor drive circuit 43 and a motor control circuit 44. The motor drive control circuit 40 is connected to a direct-current power source 92, and the motor 10 (motor circuit 190) and the motor drive control circuit 40 (more specifically, the motor drive circuit 43) are connected to each other via the connector 19A provided for the motor circuit 190 and a connector 40A provided for the motor drive circuit 43.

The motor control circuit 44 includes a CPU (not shown) and a memory (not shown), and executes the programs stored in the memory to execute on-off control over switches UH, UL, VH, VL, WH and WL of the motor drive circuit 43.

The motor drive circuit 43 is a three-phase bridge circuit that includes a first phase circuit 43V, a second phase circuit 43U and a third phase circuit 43W that are arranged between the positive electrode and the negative electrode (GND) of the direct-current power source 92.

In the first phase circuit 43V, the upper switch VH and the lower switch VL are connected in series, and a first feed line 42V is connected to a line that connects the upper switch VH and the lower switch VL to each other. The first feed line 42V is connected to the main electrical path portion 31B of the first bus bar 31 of the motor 10 (motor circuit 190) via the connectors 19A and 40A.

In the second phase circuit 43U, the upper switch UH and the lower switch UL are connected in series, and a second feed line 42U is connected to a line that connects the upper switch UH and the lower switch UL to each other. The second feed line 42U is connected to the main electrical path portion 32B of the second bus bar 32 of the motor 10 (motor circuit 190) via the connectors 19A and 40A.

In the third phase circuit 43W, the upper switch WH and the lower switch WL are connected in series, and a third feed line 42W is connected to a line that connects the upper switch WH and the lower switch WL to each other. The third feed line 42W is connected to the main electrical path portion 33B of the third bus bar 33 of the motor 10 (motor circuit 190) via the connectors 19A and 40A.

As shown in FIG. 7, the motor circuit 190 is a so-called delta-connection circuit formed by connecting a first phase coil 191, a second phase coil 192 and a third phase coil 193 to each other in a circular pattern. FIG. 8 shows the motor circuit 190 in detail. The first phase coil 191 has a structure in which a series circuit formed of the coil C5 and the coil C6 and a series circuit formed of the coil C11 and the coil C12 are connected in parallel and arranged between the first bus bar 31 and the second bus bar 32.

The second phase coil 192 has a structure in which a series circuit formed of the coil C1 and the coil C2 and a series circuit formed of the coil C7 and the coil C8 are connected in parallel and arranged between the first bus bar 31 and the third bus bar 33.

The third phase coil 193 has a structure in which a series circuit formed of the coil C3 and the coil C4 and a series circuit formed of the coil C9 and the coil CIO are connected in parallel and arranged between the second bus bar 32 and the third bus bar 33. Each pair of coils that form one series circuit is formed of one wire 50.

Figure 9:
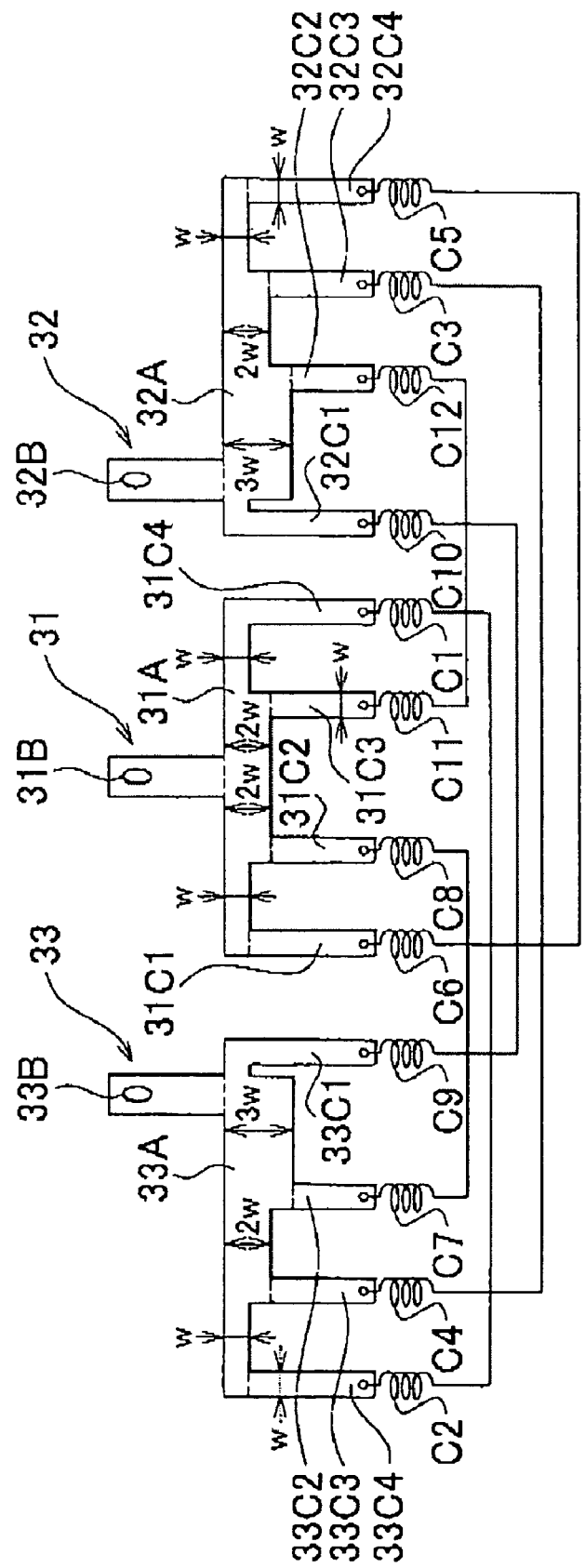
FIG. 9 is a conceptual diagram showing the manner in which the bus bars and coils are connected to each other.

As shown in FIG. 9, the end portions of the coils C6, C8, C11 and C1, among the twelve coils C1 to C12 in the motor (motor circuit 190), are connected to the four end electrical path portions 31C1 to 31C4 of the first bus bar 31, respectively. Similarly, the end portions of the coils C10, C12, C3 and C5, among the twelve coils C1 to C12 in the motor (motor circuit 190), are connected to the four end electrical path portions 32C1 to 32C4 of the second bus bar 32, respectively. Similarly, the end portions of the coils C9, C7, C4 and C2, among the twelve coils C1 to C12 in the motor (motor circuit 190), are connected to the four end electrical path portions 33C1 to 33C4 of the third bus bar 33, respectively. In FIG. 9, for convenience of explanation, the end electrical path portions and the main electrical path portions project from the intermediate electrical path portions in the opposite directions. However, in the actual state, the end electrical path portions and the main electrical path portions project from the intermediate electrical path portions in the same direction (in the direction away from the stator 12: see FIGS. 3 and 4).

More specifically, the coil C6 and the coil C1 are connected to the end electrical path portions 31C1 and 31C4 that are far from the main electrical path portion 31B, respectively, and the coil C8 and the coil C11 are connected to the end electrical path portions 31C2 and 31C3 that are close to the main electrical path portion 31B, respectively.

The coil C10 is connected to the end electrical path portion 32C1 that is the closest to the main electrical path portion 32B among the end electrical path portions 32C1 to 32C4 of the second bus bar 32. The coil C12 is connected to the end electrical path portion 32C2 that is the second closest to the main electrical path portion 32B. The coil C3 is connected to the end electrical path portion 32C3 that is the third closest to the main electrical path portion 32B. The coil C5 is connected to the end electrical path portion 32C4 that is the farthest from the main electrical path portion 32B.

The coil C9 is connected to the end electrical path portion 33C1 that is the closest to the main electrical path portion 33B among the end electrical path portions 33C1 to 33C4 of the third bus bar 33. The coil C7 is connected to the end electrical path portion 33C2 that is the second closest to the main electrical path portion 33B. The coil C4 is connected to the end electrical path portion 33C3 that is the third closest to the main electrical path portion 33B. The coil C2 is connected to the end electrical path portion 33C4 that is the farthest from the main electrical path portion 33B.

The widths and the cross sections of the intermediate electrical path portion 31A of the first bus bar 31, the intermediate electrical path portion 32A of the second bus bar 32, and the intermediate electrical path portion 33A of the third bus bar 33 according to the embodiment are set in the following manner. The intermediate electrical path portions 31A, 32A and 33A have the portions at which the multiple end electrical path portions are formed, and which are located between the main electrical path portions 31B, 32B and 33B and the end portions of the intermediate electrical path portions 31A, 32A and 33A, respectively. The widths and the cross sections of these portions of the intermediate electrical path portions 31A, 32A and 33A are decreased from the portions at which the main electrical path portions 31B, 32B and 33B are formed toward the end portions of the intermediate electrical path portions 31A, 32A and 33A in such a manner that the widths and the cross sections are decreased in a stepwise manner immediately after each intervening end electrical path portion, respectively.

More specific description will be provided below. The intermediate electrical path portions 31A, 32A and 33A have the portions at which the multiple end electrical path portions are formed, and which are located between the main electrical path portions 31B, 32B and 33B and the end portions of the intermediate electrical path portions 31A, 32A and 33A, respectively. When the number of the multiple end electrical path portions formed at each of the portions of the intermediate electrical path portions 31A, 32A and 33A between the main electrical path portions 31B, 32B and 33B and the end portions of the intermediate electrical path portions 31A, 32A, and 33A is a specific integer "n", the width of the end electrical path portion is a unit width "w", and the cross section of the end electrical path portion is a unit cross section "s", the width Wn and the cross section Sn of each of the portions of the intermediate electrical path portions 31A, 32A and 33A between the main electrical path portions 31B, 32B and 33B and the end electrical path portions that are the closest to the main electrical path portions 31B, 32B and 33B, respectively, are expressed by the following equations.

$$Wn = w \times n$$

$$Sn = s \times n$$

The width Wm and the cross section Sm of each of the portions of the intermediate electrical path portions 31A, 32A and 33A between the end electrical path portions that are the $m^{th}$ closest to the main electrical path portions 31B, 32B and 33B and the end electrical path portions that are the $m+1^{th}$ closest to the main electrical path portions 31B, 32B and 33B, respectively, are expressed by the following equations.

$$Wm = w \times (n-m)$$

$$Sm = s \times (n-m)$$

The bus bars 31, 32 and 33 will be individually described with reference to FIGS. 8 and 9. In the first bus bar 31, the main electrical path portion 31B branches from the intermediate electrical path portion 31A at the middle position between the position at which the end electrical path portion 31C2 branches from the intermediate electrical path portion 31A and the position at which the end electrical path portion 31C3 branches from the intermediate electrical path portion 31A. That is, "two" end electrical path portions 31C1 and 31C2 are formed at the portion of the intermediate electrical path portion 31A between the main electrical path portion 31B and one end portion of the intermediate electrical path portion 31A, and "two" end electrical path portions 31C3 and 31C4 are formed at the portion of the intermediate electrical path portion 31A between the main electrical path portion 31B and the other end portion of the intermediate electrical path portion 31A.

The width Wn and the cross section Sn of the portion of the intermediate electrical path portion 31A between the main electrical path portion 31B and each of the end electrical path portions 31C2 and 31C3 that are the closest to the main electrical path portion 31B are "2w" and "2s", respectively. The width Wm and the cross section Sm of each of the portions of the intermediate electrical path portion 31A that are between the end electrical path portion 31C2 and 31C3 that are the closest to the main electrical path portion 31B and the end electrical path portions 31C1 and 31C4 that are the second closest to the main electrical path portion 31B, respectively, are "w" and "s" that are the same as the width and the cross section of each of the end electrical path portions 31C1 to 31C4. That is, the width and the cross section of the intermediate electrical path portion 31A are decreased from the portion at which the main electrical path portion 31B is formed toward each of both end portions of the intermediate electrical path portion 31A in such a manner that the width and the cross section are decreased immediately after each of the end electrical path portions 31C2 and 31C3 by the unit width "w" and the unit cross section "s" that are equal to the width and the cross section of each of the end electrical path portions 31C1 to 31C4, respectively.

In the second bus bar 32, the main electrical path portion 32B branches from the intermediate electrical path portion 32A at the middle position between the position at which the end electrical path portion 32C1 branches from the intermediate electrical path portion 32A and the position at which the end electrical path portion 32C2 branches from the intermediate electrical path portion 32A. "Three" end electrical path portions 32C2, 32C3 and 32C4 are formed at the portion of the intermediate electrical path portion 32A between the main electrical path portion 32B and one end portion of the intermediate electrical path portion 32A.

The width Wn and the cross section Sn of the portion of the intermediate electrical path portion 32A between the main electrical path portion 32B and the end electrical path portion 32C2 that is the closest to the main electrical path portion 32B among the three end electrical path portions 32C2, 32C3 and 32C4 are "3w" and "3s", respectively. The width Wm and the cross section Sm of the portion of the intermediate electrical path portion 32A between the end electrical path portion 32C2 that is the (first) closest to the main electrical path portion 32B and the end electrical path portion 32C3 that is the second closest to the main electrical path portion 32B are "2w" and "2s", respectively. The width Wm and the cross section Sm of the portion of the intermediate electrical path portion 32A between the end electrical path portion 32C3 that is the second closest to the main electrical path portion 32B and the end electrical path portion 32C4 that is the third closest to the main electrical path portion 32B are "w" and "s", respectively. That is, the width and the cross section of the intermediate electrical path portion 32A are decreased from the portion at which the main electrical path portion 32B is formed toward the one end portion of the intermediate electrical path portion 32A in such a manner that the width and the cross section are decreased immediately after each of the end electrical path portions 32C2 and 32C3 by the unit width "w" and the unit cross section "s" that are equal to the width and the cross section of each of the end electrical path portions 32C1 to 32C4, respectively.

In the third bus bar 33, the main electrical path portion 33B branches from the intermediate electrical path portion 33A at the middle position between the position at which the end electrical path portion 33C1 branches from the intermediate electrical path portion 33A and the position at which the end electrical path portion 33C2 branches from the intermediate electrical path portion 33A. "Three" end electrical path portions 33C2, 33C3 and 33C4 are formed at the portion of the intermediate electrical path portion 33A between the main electrical path portion 33B and the one end portion of the intermediate electrical path portion 33A.

The width Wn and the cross section Sn of the portion of the intermediate electrical path portion 33A between the main electrical path portion 33B and the end electrical path portion 33C2 that is the closest to the main electrical path portion 33B among the three end electrical path portions 33C2, 33C3 and 33C4 are "3w" and "3s", respectively. The width Wm and the cross section Sm of the portion of the intermediate electrical path portion 33A between the end electrical path portion 33C2 that is the (first) closest to the main electrical path portion 33B and the end electrical path portion 33C3 that is the second closest to the main electrical path portion 33B are "2w" and "2s", respectively. The width Wm and the cross section Sm of the portion of the intermediate electrical path portion 33A between the end electrical path portion 33C3 that is the second closest to the main electrical path portion 33B and the end electrical path portion 33C4 that is the third closest to the main electrical path portion 33B are "w" and "s", respectively. That is, the width and the cross section of the intermediate electrical path portion 33A are decreased from the portion at which the main electrical path portion 33B is formed toward the one end portion of the intermediate electrical path portion 33A in such a manner that the width and the cross section are decreased immediately after each of the end electrical path portions 33C2 and 33C3 by the unit width "w" and the unit cross section "s" that are equal to the width and the cross section of each of the end electrical path portions 33C1 to 33C4, respectively.

The effects of the embodiment will be described below. Direct currents output from the direct-current power source 92 are converted into three-phase alternating currents through the on-off control executed over the switches UH, VH, WH etc. in the motor drive circuit 43, and the three-phase alternating currents are introduced to the first phase coil 191, the second phase coil 192 and the third phase coil 193 of the motor circuit 190 via the bus bars 31, 32 and 33.

More specifically, the electric currents introduced from the motor drive control circuit 40 to the main electrical path portion 31B of the first bus bar 31, the main electrical path portion 32B of the second bus bar 32, and the main electrical path portion 33B of the third bus bar 33 flow through the intermediate electrical path portions 31A, 32A and 33A, and then evenly distributed from the four end electrical path portions 31C1 to 31C4, the four end electrical path portions 32C1 to 32C4, and the four end electrical path portions 33C1 to 33C4 to the coils, respectively. The electric currents that are introduced from the respective groups of four coils to the end electrical path portions 31C1 to 31C4 of the first bus bar 31, the end electrical path portions 32C1 to 32C4 of the second bus bar 32, and the end electrical path portions 33C1 to 33C4 of the third bus bar 33 flow through the intermediate electrical path portions 31A, 32A, and 33A, join together in the main electrical path portions 31B, 32B and 33B, and flow to the motor drive control circuit 40, respectively.

That is, in the first bus bar 31, the amount of electric current that flows through the portion of the intermediate electrical path portion 31A between the end electrical path portions 31C2 and 31C3 that are close to the main electrical path portion 31B is approximately twice as large as the amount of electric current that flows through each of the end electrical path portions 31C1 to 31C4. The amount of electric current that flows through each of the portions of the intermediate electrical path portion 31A that are between the end electrical path portion 31C2 and the end electrical path portion 31C1 that is far from the main electrical path portion 31B and between the end electrical path portion 31C3 and the end electrical path portion 31C4 that is far from the main electrical path portion 31B is substantially equal to the amount of electric current that flows through each of the end electrical path portions 31C1 to 31C4.

In the second bus bar 32, the amount of electric current that flows through the portion of the intermediate electrical path portion 32A between the main electrical end portion 32B and the end electrical path portion 32C2 is approximately three times as large as the amount of electric current that flows through each of the end electrical path portions 32C1 to 32C4. The amount of electric current that flows through the portion of the intermediate electrical path portion 32A between the end electrical path portion 32C2 and the end electrical path portion 32C3 is approximately twice as large as the amount of electric current that flows through each of the end electrical path portions 32C1 to 32C4. The amount of electric current that flows through the portion of the intermediate electrical path portion 32A between the end electrical path portion 32C3 and the end electrical path portion 32C4 is substantially equal to the amount of electric current that flows through each of the end electrical path portions 32C1 to 32C4.

In the third bus bar 33 as well as in the second bus bar 32, the amount of electric current that flows through the portion of the intermediate electrical path portion 33A between the main electrical end portion 33B and the end electrical path portion 33C2 is approximately three times as large as the amount of electric current that flows through each of the end electrical path portions 33C1 to 33C4. The amount of electric current that flows through the portion of the intermediate electrical path portion 33A between the end electrical path portion 33C2 and the end electrical path portion 33C3 is approximately twice as large as the amount of electric current that flows through each of the end electrical path portions 33C1 to 33C4. The amount of electric current that flows through the portion of the intermediate electrical path portion 33A between the end electrical path portion 33C3 and the end electrical path portion 33C4 is substantially equal to the amount of electric current that flows through each of the end electrical path portions 33C1 to 33C4.

According to the embodiment, the width and the cross section of each of the intermediate electrical path portion 31A of the first bus bar 31, the intermediate electrical path portion 32A of the second bus bar 32, and the intermediate electrical path portion 33A of the third bus bar 33 are increased as the amount of electric current that flows therethrough increases. More specific description will be provided below. In the following description, the width and the cross section of each of the end electrical path portions 31C1 to 31C4, 32C1 to 32C4, and 33C1 to 33C4 will be referred to as the unit width "w" and the unit cross section "s", respectively. In the portions of the intermediate electrical path portions 31A, 32A, and 33A at which "n" units of end electrical path portions are formed between the main electrical path portions 31B, 32B and 33B and end portions of the intermediate electrical path portions 31A, 32A and 33A, the width Wn and the cross section Sn of each of the portions of the intermediate electrical path portions 31A, 32A and 33A between the main electrical path portions 31B, 32B and 33B and the end electrical path portions that are the closest to the main electrical path portions 31B, 32B and 33B, respectively, are the greatest values expressed by the following equations.

$Wn = w \times n$ $Sn = s \times n.$

The widths and the cross sections of the intermediate electrical path portions 31A, 32A and 33A are decreased from the portions at which the main electrical path portions 31B, 32B and 33B are formed toward the end portions of the intermediate electrical path portions 31A, 32A and 33A in such a manner that the widths and the cross sections are decreased immediately after each intervening end electrical path portion by the unit width "w" and the unit cross section "s" that are equal to the width and the cross section of each of the end electrical path portions 31C1 to 31C4, 32C1 to 32C4 and 33C1 to 33C4, respectively.

Thus, it is possible to prevent the current densities in the intermediate electrical path portion 31A of the first bus bar 31, the intermediate electrical path portion 32A of the second bus bar 32 and the intermediate electrical path portion 33A of the third bus bar 33 from being excessive so that the current densities are maintained substantially constant. It is also possible to attain lighter bus bars 31, 32 and 33, and, consequently, to attain lighter motor 10.

Figure 10:
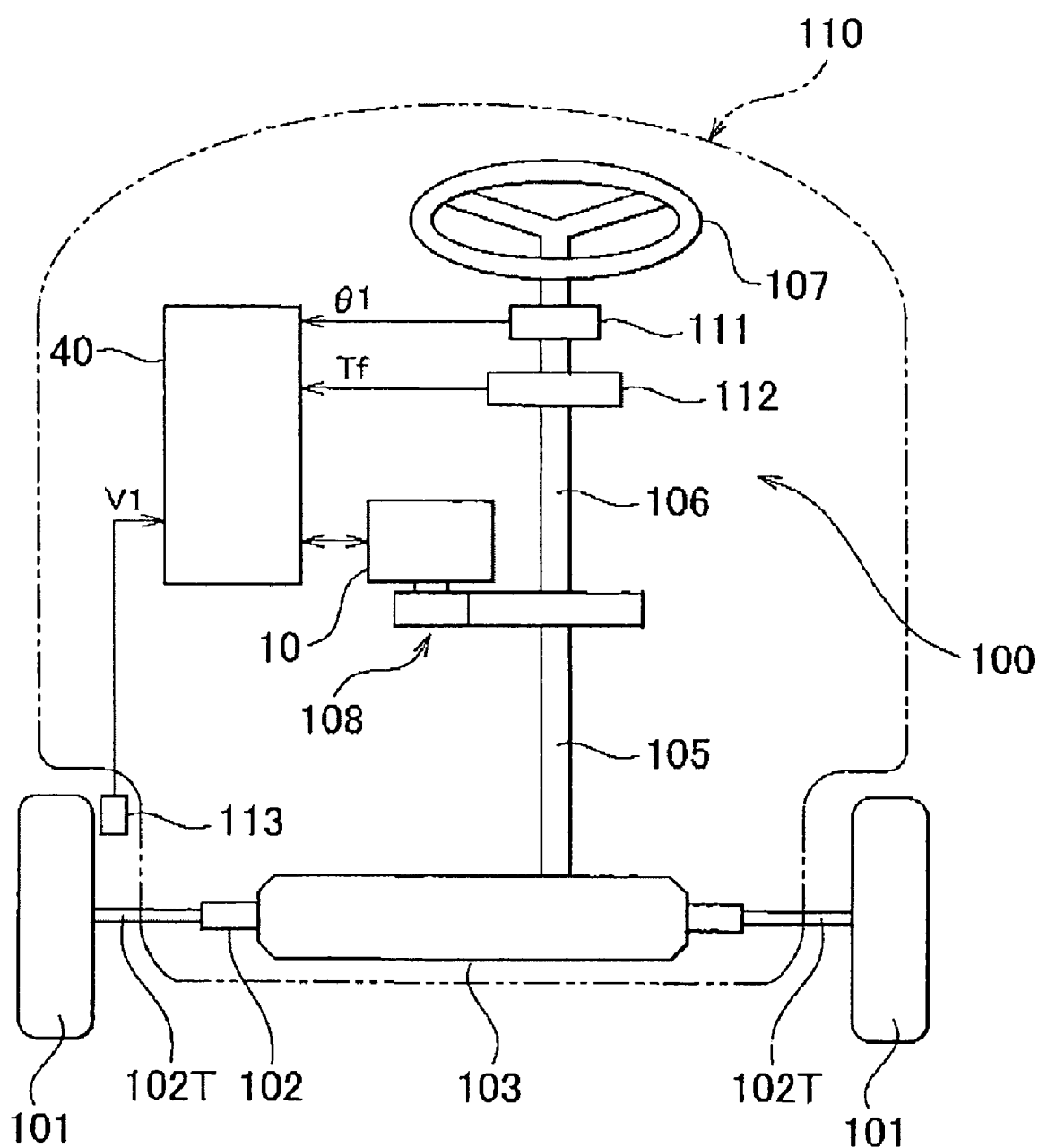
FIG. 10 is a conceptual view showing a vehicle that includes an electric power steering apparatus.

Next, an electric power steering apparatus 100 that uses the motor 10 will be described. As shown in FIG. 10, the electric power steering apparatus 100 includes an inter-steered wheel shaft 102 that are provided between steered wheels 101 of a vehicle 110, and a shaft case 103 that covers the inter-steered wheel shaft 102. The both ends of the inter-steered wheel shaft 102 are connected to the respective steered wheels 101 via tie rods 102T, and the shaft case 103 is fixed to the main body of the vehicle 110. A rack (not shown) is formed in a middle portion of the inter-steered wheel shaft 102, and a pinion (not shown) that passes through a middle portion of the shaft case 103 from the side is meshed with the rack.

An intermediate shaft 105 is connected to the upper end portion of the pinion, a steering shaft 106 is connected to the upper end portion of the intermediate shaft 105, and a steering wheel 107 is connected to the upper end portion of the steering shaft 106. The rotor 13 of the motor 10 is connected via a speed reduction mechanism 108 to a portion at which the intermediate shaft 105 and the steering shaft 106 are connected to each other. A steering angle sensor 111 and a torque sensor 112 are fitted to the steering shaft 106. The steering angle sensor 111 detects the steering angle θ1 of the steering wheel 107, and the torque sensor 112 detects the steering torque Tf that is applied to the steering shaft 106. A vehicle speed sensor 113 that detects the vehicle speed V1 based on the rotation of the steered wheel 101 is provided near the steered wheel 101. The motor control circuit 44 drives the motor 10 based on the operation state that is determined according to the detection signals from the steering angle sensor 111, the torque sensor 112 and the vehicle speed sensor 113. Thus, the motor 10 assists a steering operation performed by the driver when the steered wheels 101 are steered.

According to the embodiment described above, it is possible to attain the lighter electric power steering apparatus 100 by attaining the lighter motor 10.

The invention is not limited to the above-described embodiment. The technical scope of the invention includes following embodiments. In addition, other various modifications may be made to the embodiment within the scope of the invention.

1) In the embodiment described above, the width and the cross section of each of the main electrical path portion 31B of the first bus bar 31, the main electrical path portion 32B of the second bus bar 32, and the main electrical path portion 33B of the third bus bar 33 may be approximately four times as large as the unit width "w" and the unit cross section "s" that are equal to the width and the cross section of the end electrical path portion, respectively. This is because the amount of electric current that flows through each of the main electrical path portions 31B, 32B and 33B is approximately four times as large as the amount of electric current that flows through each end electrical path portion.

2) In the embodiment described above, the delta-connection circuit is formed by the three bus bars 31, 32 and 33 for three phases and the twelve coils C1 to C12. Alternatively, a bus bar that forms a neutral point may be added to form a star-connection circuit. The number of coils is not limited to twelve, and may be changed as required based on the number of field magnets (segment magnets 17) (the number of poles).

3) In the embodiment described above, the invention is applied to the three-phase alternating-current motor. Alternatively, the invention may be applied to polyphase alternating-current motors other than a three-phase alternating-current motor.

4) In the embodiment described above, the invention is applied to all the three bus bars 31, 32 and 33. Alternatively, the invention may be applied to only one of the bus bars.

5) In the embodiment described above, the thickness of each of the intermediate electrical path portions 31A, 32A and 33A is constant, and the width thereof is changed. Alternatively, the width may be constant and the thickness may be changed. Further alternatively, both the width and the thickness may be changed.

6) In the embodiment described above, the second bus bar 32 and the third bus bar 33 are made of metal sheets that are formed in the same shape using the same stamping die. However, the first bus bar 31, the second bus bar 32 and the third bus bar 33 may be all made of metal sheets that are formed in the same shape using the same stamping die, if the main electrical path portions 31B, 32B and 33B need not be arranged close to each other at one position in the circumferential direction of the stator 12.

7) In the embodiments described above, the thickness direction of the intermediate electrical path portion 31A of the bus bar 31, the intermediate electrical path portion 32A of the bus bar 32 and the intermediate electrical path portion 33A of the bus bar 33 coincides with the radial direction of the stator 12. Alternatively, the thickness direction of the intermediate electrical path portions 31A, 32A and 33A may coincide with the axial direction of the stator 12 so that the intermediate electrical path portions 31A, 32A and 33A overlap with each other in the axial direction of the stator 12.

What is claimed is:

1. A polyphase alternating-current motor, comprising:
    a stator;
    a plurality of coils that are arranged in a circumferential direction of the stator; and
    a plurality of bus bars the number of which corresponds to the number of phases, and that receive a polyphase alternating-current,
    wherein the bus bars are arranged at one end portion of the stator, and end portions of the coils are connected to the corresponding bus bars,
    wherein each of the bus bars has
    an intermediate electrical path portion that extends along the circumferential direction of the stator,
    a plurality of end electrical path portions that branch from the intermediate electrical path portion at multiple positions in the circumferential direction of the stator, and that are connected at end portions to the end portions of the coils, and
    a main electrical path portion that is formed at one position of the intermediate electrical path portion, and that is connected to a motor drive circuit, and
    wherein a shape of a portion of the intermediate electrical path portion at which the multiple end electrical path portions are formed between the main electrical path portion and an end portion of the intermediate electrical path portion is changed from a portion at which the main electrical path portion is formed toward the end portion of the intermediate electrical path portion in such a manner that the shape is changed after each intervening end electrical path portion.

2. The polyphase alternating-current motor according to claim 1, wherein a width of the portion of the intermediate electrical path portion at which the multiple end electrical path portions are formed between the main electrical path portion and the end portion of the intermediate electrical path portion is decreased from the portion at which the main electrical path portion is formed toward the end portion of the intermediate electrical path portion in such a manner that the width is decreased after each intervening end electrical path portion.

3. The polyphase alternating-current motor according to claim 2, wherein:
    all the end electrical path portions have the same width; and
    in the portion of the intermediate electrical path portion at which the multiple end electrical path portions are formed between the main electrical path portion and the end portion of the intermediate electrical path portion, when the number of the multiple end electrical path portions is a specific integer "n", and a width of each of the end electrical path portions is a unit width "w", a width Wn of a portion of the intermediate electrical path portion between the main electrical path portion and the end electrical path portion that is the closest to the main electrical path portion is expressed by an equation, $$Wn = w \times n,$$

and a width Wm of a portion of the intermediate electrical path portion between the end electrical path portion that is the $m^{th}$ closest to the main electrical path portion and the end electrical path portion that is the $m+1^{th}$ closest to the main electrical path portion is expressed by an equation, $$Wm = w \times (n-m).$$

4. The polyphase alternating-current motor according to claim 1, wherein a cross section of the portion of the intermediate electrical path portion at which the multiple end electrical path portions are formed between the main electrical path portion and the end portion of the intermediate electrical path portion is decreased from the portion at which the main electrical path portion is formed toward the end portion of the intermediate electrical path portion in such a manner that the cross section is decreased after each intervening end electrical path portion.

5. The polyphase alternating-current motor according to claim 4, wherein:
    all the end electrical path portions have the same cross section; and
    in the portion of the intermediate electrical path portion at which the multiple end electrical path portions are formed between the main electrical path portion and the end portion of the intermediate electrical path portion, when the number of the multiple end electrical path portions is a specific integer "n", and a cross section of each of the end electrical path portions is a unit cross section "s", a cross section Sn of a portion of the intermediate electrical path portion between the main electrical path portion and the end electrical path portion that is the closest to the main electrical path portion is expressed by an equation, $$Sn = s \times n,$$

and a cross section Sm of a portion of the intermediate electrical path portion between the end electrical path portion that is the $m^{th}$ closest to the main electrical path portion and the end electrical path portion that is the $m+1^{th}$ closest to the main electrical path portion is expressed by an equation, $$Sm = s \times (n-m).$$

6. The polyphase alternating-current motor according to claim 1, wherein:
the polyphase alternating-current is a three-phase alternating current; and
a delta-connection circuit is formed by the three bus bars for three phases and the multiple coils that are grouped by the three phases.

7. The polyphase alternating-current motor according to claim 2, wherein:
the polyphase alternating-current is a three-phase alternating current; and
a delta-connection circuit is formed by the three bus bars for three phases and the multiple coils that are grouped by the three phases.

8. The polyphase alternating-current motor according to claim 3, wherein:
the polyphase alternating-current is a three-phase alternating current; and
a delta-connection circuit is formed by the three bus bars for three phases and the multiple coils that are grouped by the three phases.

9. The polyphase alternating-current motor according to claim 4, wherein:
the polyphase alternating-current is a three-phase alternating current; and
a delta-connection circuit is formed by the three bus bars for three phases and the multiple coils that are grouped by the three phases.

10. The polyphase alternating-current motor according to claim 5, wherein:
the polyphase alternating-current is a three-phase alternating current; and
a delta-connection circuit is formed by the three bus bars for three phases and the multiple coils that are grouped by the three phases.

11. An electric power steering apparatus, wherein the polyphase alternating-current motor according to claim 1 is provided as a drive source.

12. An electric power steering apparatus, wherein the polyphase alternating-current motor according to claim 3 is provided as a drive source.

13. An electric power steering apparatus, wherein the polyphase alternating-current motor according to claim 5 is provided as a drive source.

* * * * *